(12) United States Patent
Takushima et al.

(10) Patent No.: US 6,823,114 B2
(45) Date of Patent: Nov. 23, 2004

(54) OPTICAL SIGNAL PROCESSING APPARATUS

(75) Inventors: Michiko Takushima, Yokohama (JP); Tomomi Sano, Yokohama (JP); Hiroshi Suganuma, Yokohama (JP); Tatsuhiko Tanaka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 32 days.

(21) Appl. No.: 10/386,605

(22) Filed: Mar. 13, 2003

(65) Prior Publication Data

US 2003/0189765 A1 Oct. 9, 2003

(30) Foreign Application Priority Data

Mar. 13, 2002 (JP) ...................................... P2002-068894

(51) Int. Cl.[7] ................................................. G02B 6/34
(52) U.S. Cl. ........................................... 385/37; 398/79
(58) Field of Search ............................ 385/37; 398/79, 398/84, 86, 87

(56) References Cited

U.S. PATENT DOCUMENTS

2003/0039008 A1 * 2/2003 Davies ....................... 359/130
2003/0068124 A1 * 4/2003 Barton et al. ................. 385/24

\* cited by examiner

Primary Examiner—Mark A. Robinson
Assistant Examiner—Alessandro Amari
(74) Attorney, Agent, or Firm—McDermott Will & Emery LLP

(57) ABSTRACT

This invention provides an optical signal processing apparatus capable of size reduction. When signal light with multiple wavelengths $\lambda_1$ to $\lambda_4$ is collimated by and output from a fiber collimator, the signal light components with multiple wavelengths $\lambda_1$ to $\lambda_4$ are diffracted by a diffraction grating at diffraction angles corresponding to the wavelengths and separated for the respective wavelengths. The separated signal light components of the respective wavelengths are output to spatially different optical paths. The signal light components having the wavelengths $\lambda_n$ are deflected at their optical paths by prisms to increase the optical path interval and then input to fiber collimators.

15 Claims, 12 Drawing Sheets

OPTICAL SIGNAL PROCESSING APPARATUS

BACKGROUND OF THE INVENTION

1. Field of the Invention

The present invention relates to an optical signal processing apparatus for processing signal light with multiple wavelengths.

2. Related Background Art

An optical signal processing apparatus separates multiplexed signal light with wavelengths into light components of the respective wavelengths and individually outputs the signal light components of the respective wavelengths, or multiplexes signal light components with different wavelengths, which are input for the respective wavelengths, and outputs signal light with multiple wavelengths. Alternatively, an optical signal processing apparatus separates signal light with multiple wavelengths into signal light components of the respective wavelengths, executes certain processing (e.g., loss impartation), then multiplexes the signal light components, and outputs signal light with multiple wavelengths. Such an optical signal processing apparatus is used in an optical communication system as an optical multiplexer, an optical demultiplexer, or a loss filter.

For example, an optical signal processing apparatus makes multiplexed signal light with wavelengths incident on a diffraction grating, separates the signal light into signal light components of the respective wavelengths using a fact that the optical diffraction angle of the diffraction grating changes depending on the wavelength, and outputs the separated signal light components of the respective wavelengths to spatially different optical paths. This optical signal processing apparatus imparts a predetermined loss to the spatially separated signal light components of the respective wavelengths, multiplexes the signal light components of the respective wavelengths, and outputs the multiplexed signal light with the wavelengths. That is, the optical signal processing apparatus operates as a loss filter. As an apparatus of this type, an optical signal processing apparatus disclosed in WO 01/04674A1 is known.

When the optical signal processing apparatus should perform processing for the signal light components of the respective wavelengths, the spatial interval between the optical paths of the signal light components of the respective wavelengths is preferably sufficiently large at the processing position. When the optical signal processing apparatus should multiplex or demultiplex wavelengths, the spatial interval between the optical paths of the signal light components of the respective wavelengths is preferably sufficiently large at the position where the signal light components are input or output for the respective wavelengths. In the latter case, if a fiber collimator is arranged at the position where the signal light components are input or output for the respective wavelengths, the spatial interval between the optical paths of the signal light components of the respective wavelengths must be larger than the outer diameter of the fiber collimator.

SUMMARY OF THE INVENTION

Let $\Lambda$ be the grating period of a diffraction grating, $\lambda$ be the wavelength of light incident on the diffraction grating, $\beta_0$ be the incident angle of light on the diffraction grating, and $\beta_1$ be the diffraction angle. At this time, a relation given by $$m\lambda = \Lambda(\sin \beta_0 + \sin \beta_1) \tag{1}$$

holds. In this case, m is the diffraction order. In a signal light wavelength band (1.55 $\mu$m) used in optical communication, the diffraction angle difference with respect to the unit wavelength difference is as small as 0.1 deg/nm or less. Hence, when the interval between the optical paths of the signal light components of the respective wavelengths should be sufficiently large after wavelength separation by the diffraction grating, the optical path length from the diffraction grating increases. For this reason, a conventional optical signal processing apparatus is bulky.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention has been made to solve the above problem, and has as its object to provide an optical signal processing apparatus capable of size reduction.

An optical signal processing apparatus according to the present invention is characterized by comprising (1) wavelength separation means for receiving multiplexed signal light having multiple wavelengths $\lambda_1$ to $\lambda_N$ ($\lambda_{n-1} < \lambda_n$; N is an integer, $2 \leq N$; n is an integer, $2 \leq n \leq N$), separating the multi-wavelength signal light into signal light components of respective wavelengths, and outputting the separated signal light components of the respective wavelengths to spatially different optical paths, and (2) optical path changing means for changing the optical paths of the signal light components of the respective wavelengths output from the wavelength separation means. The optical signal processing apparatus is also characterized in that for a first signal light component (wavelength $\lambda_{n-1}$) and second signal light component (wavelength $\lambda_n$), which have adjacent wavelengths in the signal light components with the multiple wavelengths, letting G be a position at which the multi-wavelength signal light is wavelength-separated by the wavelength separation means, $P_{n-1}$ be a position at which an optical path of the first signal light component is changed by the optical path changing means, $L_{n-1}$ be a distance from the position G to the position $P_{n-1}$ along the optical path of the first signal light component, and $P_n$ be a position which is located on an optical path of the second signal light component from the position G to the optical path changing means or on an extended line of the optical path, and separated from the position G by the distance $L_{n-1}$, a distance between the optical paths of the first and second signal light components, which are changed by the optical path changing means, is set to be larger than a distance between the position $P_{n-1}$ and the position $P_n$.

In this optical signal processing apparatus, when the multiplexed signal light having multiple wavelengths $\lambda_1$ to $\lambda_N$ is input to the wavelength separation means, the signal light of the multiple wavelengths is separated for the respective wavelengths and output to different optical paths. The optical paths of the signal light components of the respective wavelengths, which are wavelength-separated, are changed by the optical path changing means. With this optical path change, the optical path interval between the signal light components of the respective wavelengths is increased. The signal light components can also propagate in a reverse direction. Even when the degree of optical path separation for the signal light components of the respective wavelengths by the wavelength separation means is low, the optical path interval between the signal light components of the respective wavelengths is increased by the optical path changing means. Hence, the optical signal processing apparatus according to the present invention can be made compact because the optical path after optical path separation for the signal light components of the respective wavelengths by the wavelength separation means can be short.

The optical signal processing apparatus according to the present invention preferably includes a diffraction grating. In this case, letting $\Lambda$ be a grating period of the diffraction grating, $\theta$ be an angle made by a plane perpendicular to a grating direction of the diffraction grating and an incident direction of signal light on the diffraction grating, $\beta_n$ be a diffraction angle when a traveling direction of the second signal light component, which is diffracted by the diffraction grating, is projected to the plane perpendicular to the grating direction, $\beta_{n-1}$ be a diffraction angle when a traveling direction of the first signal light component, which is diffracted by said diffraction grating, is projected to the plane perpendicular to the grating direction and $\Delta L$ be a distance from a diffraction position on the diffraction grating to a light-receiving position along the optical path of the second signal light component, a distance $\Delta d$ between the light-receiving position of the second signal light component wavelength-separated by the diffraction grating and a light-receiving position of the first signal light component wavelength-separated by the diffraction grating satisfies $$\Delta d > 2\Delta L \cos\theta \sin(|\beta_n - \beta_{n-1}|/2).$$

In this case, the optical paths of the signal light components of the respective wavelengths are separated by the diffraction grating serving as the wavelength separation means. After that, the optical path interval between the signal light components of the respective wavelengths is increased such that the above inequality is satisfied. When the outer diameter of the fiber collimator used to input/output the signal light is taken into consideration, the distance $\Delta d$ is preferably 1 mm or more. The distance $\Delta d$ is more preferably 1.5 mm or more. Most preferably, the distance $\Delta d$ is 3 mm or more.

In the optical signal processing apparatus according to the present invention, preferably, the wavelength separation means includes two diffraction gratings having identical structures, and the signal light is sequentially diffracted by the two diffraction gratings. In this case, the signal light with the multiple wavelengths is sequentially diffracted by the two diffraction gratings and wavelength-separated. Since the signal light components of the respective wavelengths travel in parallel to each other after the second diffraction, the optical signal processing apparatus can easily be assembled.

In the optical signal processing apparatus according to the present invention, the optical path changing means preferably includes a prism. In addition, the optical path changing means preferably includes an integrated member which changes the optical paths of the multi-wavelength signal light components. In this case, the optical paths of the wavelength-separated signal light components of the respective wavelengths are changed by the prism to increase the optical path interval.

In the optical signal processing apparatus according to the present invention, the optical path changing means preferably changes the optical paths of the signal light components of the respective wavelengths output from the wavelength separation means to a direction perpendicular to a predetermined plane including the optical paths of the signal light components of the respective wavelengths from the wavelength separation means to the optical path changing means. In this case, the optical elements that constitute the optical path changing means can easily be arranged, and the optical signal processing apparatus can easily be assembled.

In the optical signal processing apparatus according to the present invention, the optical path changing means preferably changes the optical paths so as to make an optical path of a signal light component having a wavelength $\lambda_{2p}$ (p is an integer, $2 \leq 2p \leq N$) and that of a signal light component having a wavelength $\lambda_{2q-1}$ (q is an integer, $1 \leq 2q-1 \leq N$) travel in different directions. At this time, the apparatus preferably further comprises first optical multiplex means for multiplexing the signal light components having the wavelengths $\lambda_{2p}$ after the optical paths are changed by the optical path changing means and outputting the signal light and also further comprises second optical multiplex means for multiplexing the signal light components having the wavelengths $\lambda_{2q-1}$ after the optical paths are changed by the optical path changing means and outputting the signal light. Alternatively, the optical path changing means preferably changes the optical path of the signal light component with the wavelength $\lambda_{2p}$ to a direction perpendicular to the predetermined plane, then changes the optical path to a direction reverse to the direction of the optical path of the signal light component on the predetermined plane, and makes the signal light component incident on the wavelength separation means. In addition, the optical path changing means preferably changes the optical path of the signal light component with the wavelength $\lambda_{2q-1}$ to a direction perpendicular to the predetermined plane, then changes the optical path to a direction reverse to the direction of the optical path of the signal light component on the predetermined plane, and makes the signal light component incident on the wavelength separation means. In this case, the optical signal processing apparatus can operate as an interleaver.

DETAILED DESCRIPTION OF THE PREFERRED EMBODIMENTS

Figure 1:
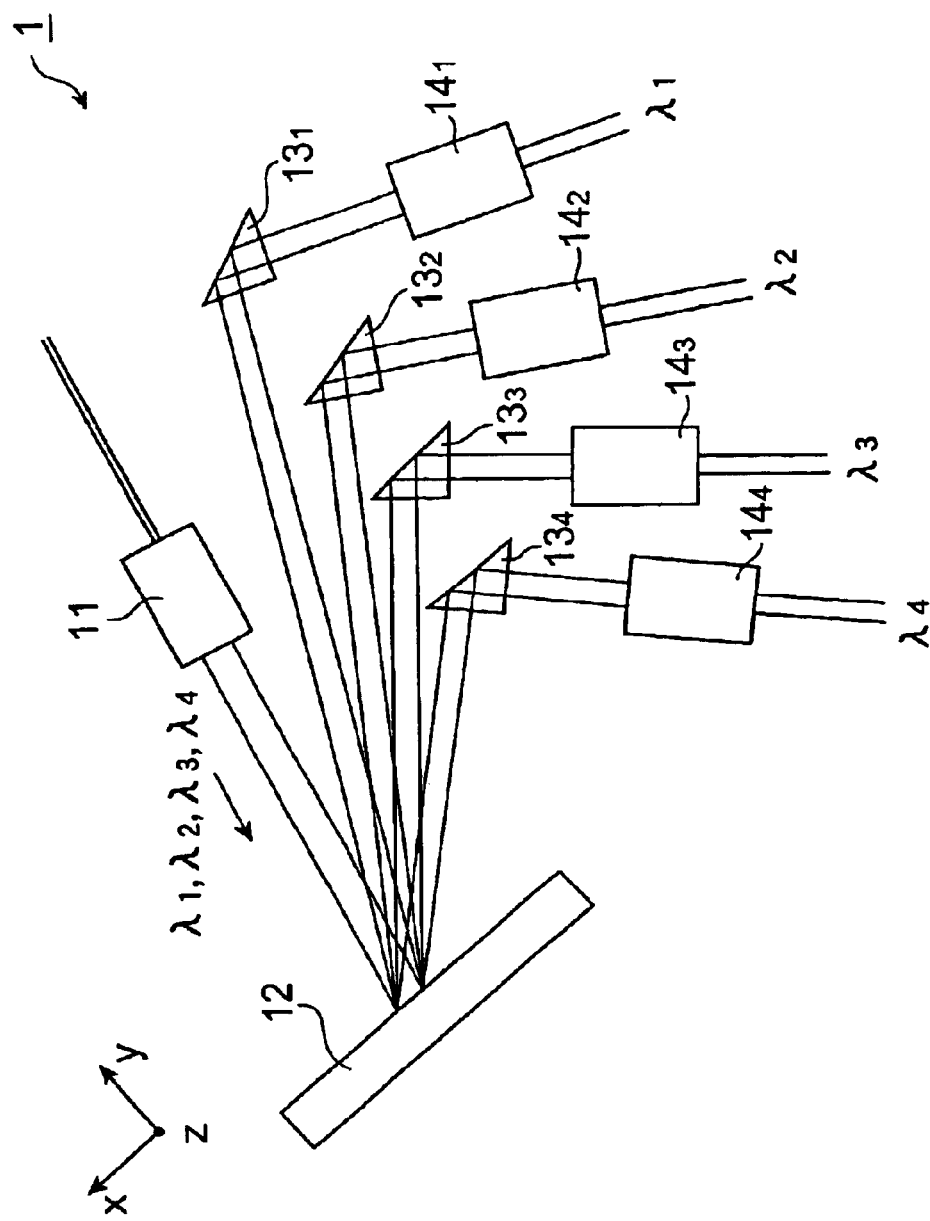
FIG. 1 is a view showing the arrangement of an optical signal processing apparatus 1 according to the first embodiment.

The embodiments of the present invention will be described below in detail with reference to the accompanying drawings. The same reference numerals denote the same elements throughout the drawings, and a repetitive description thereof will be omitted.

(First Embodiment)

An optical signal processing apparatus according to the first embodiment of the present invention will be described first. FIG. 1 is a view showing the arrangement of an optical signal processing apparatus 1 according to the first embodiment. FIG. 1 shows an x-y-z Cartesian coordinate system for the descriptive convenience. The optical signal processing apparatus 1 shown in FIG. 1 can be used as a 4-channel optical multiplexer/demultiplexer and comprises a fiber collimator 11, a diffraction grating 12 serving as a wavelength separation means, right-angle prisms $13_1$ to $13_4$ serving as optical path changing means, and fiber collimators $14_1$ to $14_4$.

Each of the fiber collimators 11 and $14_1$ to $14_4$ is formed from an optical fiber having a distal end processed into a spherical shape or an optical fiber with a lens connected to its distal end and has a collimator function. Each of the fiber collimators 11 and $14_1$ to $14_4$ can collimate light that has propagated through the optical fiber and reached the distal end and output the light, or focus external light that has reached the distal end and make the light propagate through the optical fiber. For the diffraction grating 12, parallel gratings are formed in the z-axis direction at a period $\Lambda$.

The fiber collimator 11 collimates signal light having multiple wavelengths $\lambda_1$ to $\lambda_4$ and outputs the signal light. The output signal light travels in parallel to the x-y plane. The diffraction grating 12 receives the signal light with multiple wavelengths, separates the signal light with multiple wavelengths into signal light components of the respective wavelengths, and outputs the signal light components of the respective wavelengths to spatially different optical paths. More specifically, the diffraction grating 12 receives the multi-wavelength signal light collimated by and output from the fiber collimator 11 on its grating surface at an incident angle $\beta_0$ and diffracts signal light with a wavelength $\lambda_n$ at a diffraction angle $\beta_n$ corresponding to the wavelength (n is an integer, $1 \leq n \leq 4$). The diffracted signal light components of the respective wavelengths also travel in parallel to the x-y plane. The angles have a relation given by $$m\lambda_n = \Lambda(\sin\beta_0 + \sin\beta_n) \quad (2)$$

Prisms $13_n$ deflect, by 90°, the optical paths of the signal light components having the wavelengths $\lambda_n$, which are diffracted by and output from the diffraction grating 12. Each signal light component with a deflected optical path also travels in parallel to the x-y plane. Fiber collimators $14_n$ focus and receive the signal light components having the wavelengths n output from the prisms $13_n$.

In this optical signal processing apparatus 1, when the signal light components with the multiple wavelengths $\lambda_1$ to $\lambda_4$ are collimated by and output from the fiber collimator 11, the signal light components with the wavelengths $\lambda_1$ to $\lambda_4$ are diffracted by the diffraction grating 12 at diffraction angles corresponding to the wavelengths and separated for the respective wavelengths. The separated signal light components of the respective wavelengths are output to spatially different optical paths. The signal light components with the wavelengths $\lambda_n$ are deflected at their optical paths by the prisms $13_n$ and input to the fiber collimators $14_n$. In this case, the optical signal processing apparatus 1 operates as an optical demultiplexer which demultiplexes the signal light with the multiple wavelengths $\lambda_1$ to $\lambda_4$.

When the signal light components with the wavelengths $\lambda_n$ are collimated by and output from the fiber collimators $14_n$, the signal light components with the wavelengths $\lambda_n$ are deflected at their optical paths by the prisms $13_1$, become incident on the diffraction grating 12 and are diffracted, and input to the fiber collimator 11. In this case, the optical signal processing apparatus 1 operates as an optical multiplexer which multiplexes the signal light components with the multiple wavelengths $\lambda_1$ to $\lambda_4$.

Figure 2:
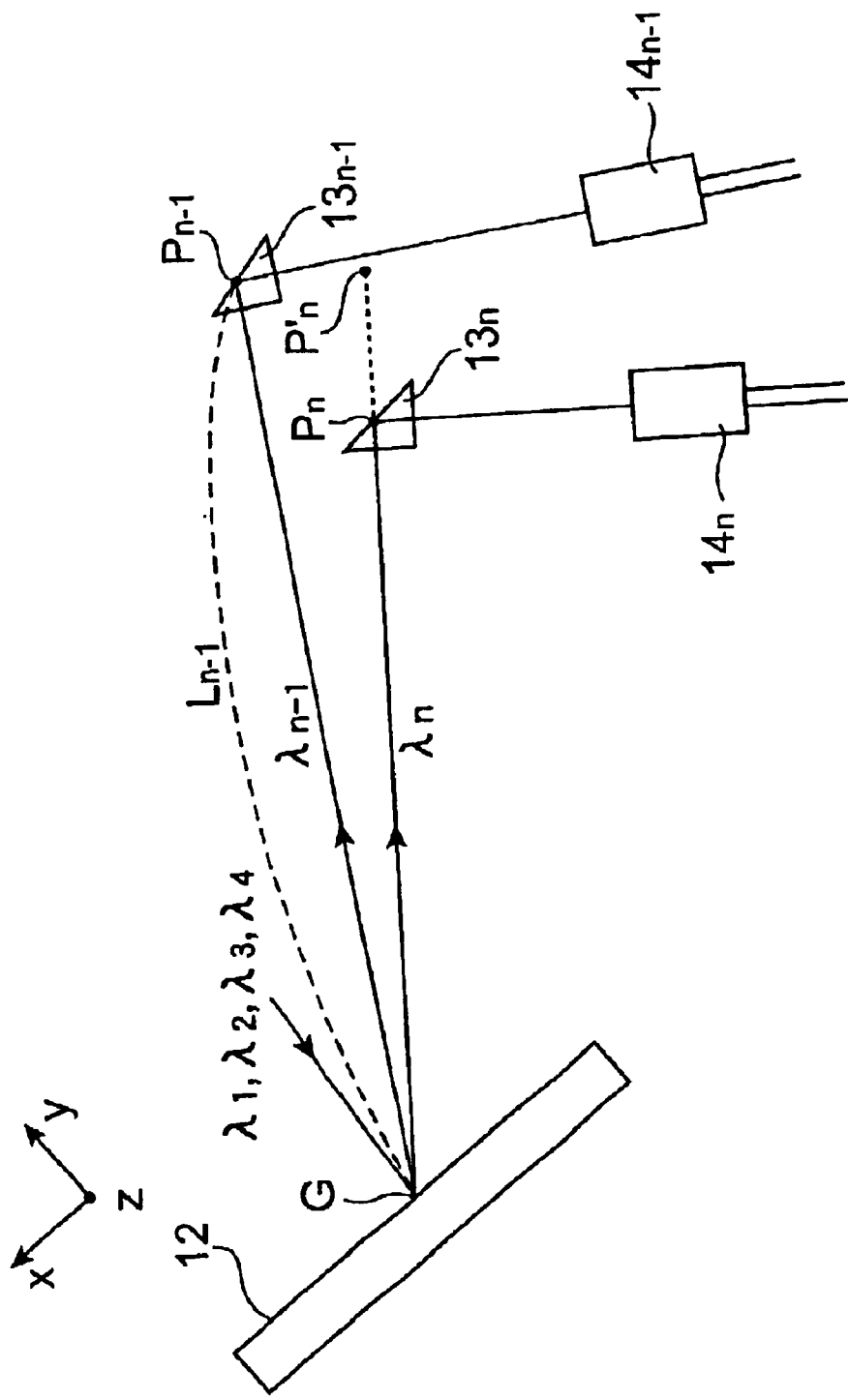
FIG. 2 is an explanatory view of the signal light optical path between a diffraction grating 12 and a fiber collimator $14_n$ in the optical signal processing apparatus 1 according to the first embodiment.

FIG. 2 is an explanatory view of the signal light optical path between the diffraction grating 12 and the fiber collimator $14_n$ in the optical signal processing apparatus 1 according to the first embodiment. FIG. 2 shows the optical paths of signal light components having adjacent wavelengths $\lambda_{n-1}$ and $\lambda_n$ of the signal light components with the multiple wavelengths $\lambda_1$ to $\lambda_4$. Note that $\lambda_1 < \lambda_2 < \lambda_3 < \lambda_4$. Referring to FIG. 2, a position G is a position at which multi-wavelength signal light is incident on the diffraction grating 12 and wavelength-separated. A position $P_{n-1}$ is a position at which the optical path of the signal light component having the wavelength $\lambda_{n-1}$ is deflected by the prism $13_{n-1}$. A distance from the position G to the position $P_{n-1}$ along the optical path of the signal light component having the wavelength $\lambda_{n-1}$ is defined as $L_{n-1}$. A position $P_n'$ is located on the extended line of the optical path of the signal light component having the wavelength $\lambda_n$, which travels from the position G to the prism $13_n$. The distance from the position G to the position $P_n'$ is $L_{n-1}$. At this time, the distance between the optical path of the signal light component with the wavelength $\lambda_{n-1}$ after deflection by the prism $13_{n-1}$ and the optical path of the signal light component with the wavelength $\lambda_n$ after deflection by the prism $13_n$ is set to be larger than the distance between the position $P_{n-1}$ and the position $P_n'$.

Figure 3:
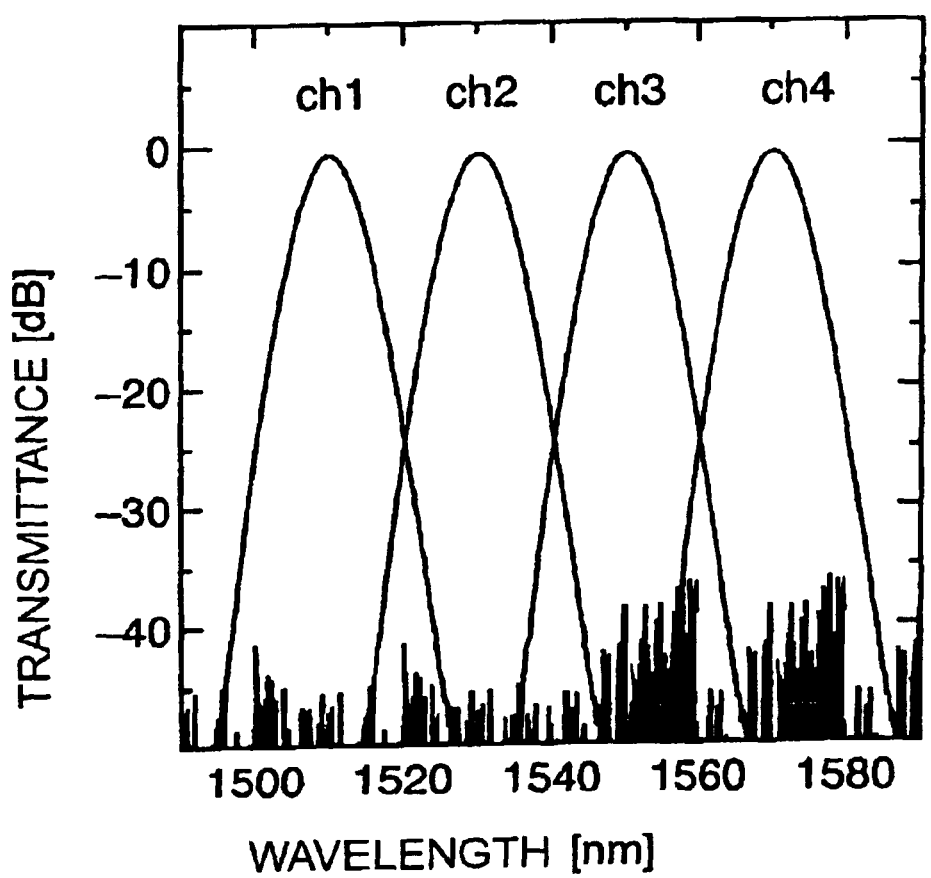
FIG. 3 is a graph showing the transmission characteristics of the optical signal processing apparatus 1 according to the first embodiment.

FIG. 3 is a graph showing the transmission characteristics of the optical signal processing apparatus 1 according to the first embodiment. FIG. 3 shows the transmission characteristic between the fiber collimator 11 and each fiber collimator $14_n$. The grating period $\Lambda$ of the diffraction grating 12 is 600 slits/mm. The incident angle $\beta_0$ of signal light on the diffraction grating 12 is 15°. The lens diameter of each fiber collimator $14_n$ is 2 mm. In addition, $\lambda_1 = 1510$ nm, $\lambda_2 = 1530$ nm, $\lambda_3 = 1550$ nm, and $\lambda_4 = 1570$ nm.

Figure 4B:
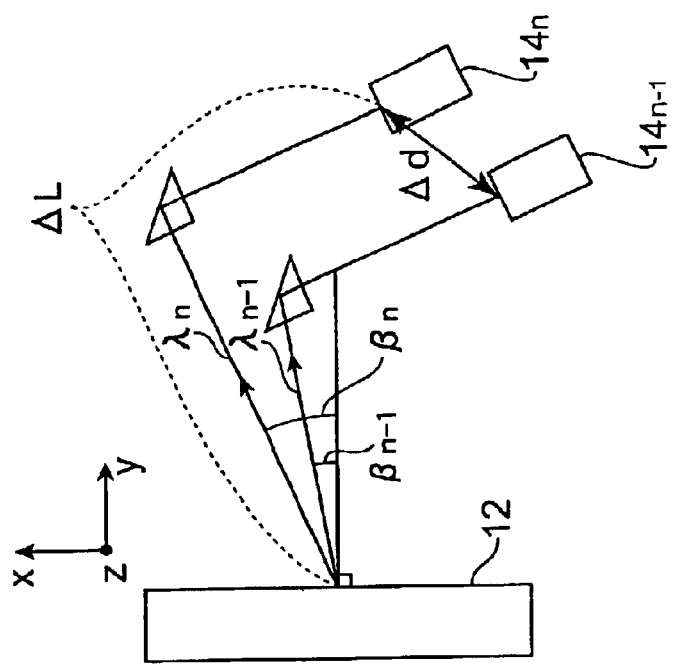
FIGS. 4A and 4B are views for explaining the incidence and diffraction of signal light on the diffraction grating 12 of the optical signal processing apparatus 1 according to the first embodiment.
Figure 4A:
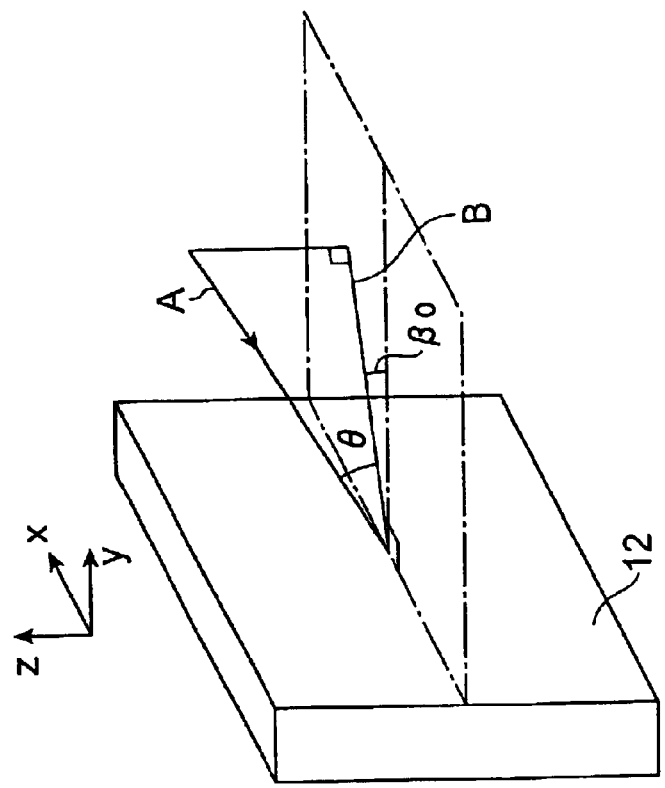

In the above-described case, the signal light travels in parallel to the x-y plane perpendicular to the grating direction (z-axis direction) of the diffraction grating 12. Even in any other case, the distance between the optical path of the signal light component with the wavelength $\lambda_{n-1}$ after deflection by the prism $13_{n-1}$ and the optical path of the signal light component with the wavelength $\lambda_n$ after deflection by the prism $13_n$ is set to be larger than the distance between the position $P_{n-1}$ and the position $P_n'$, as described above. A general case wherein the direction of incidence of signal light on the diffraction grating 12 makes an angle θ with respect to the x-y plane will be described below. FIGS. 4A and 4B are views for explaining the incidence and diffraction of signal light on the diffraction grating 12 of the optical signal processing apparatus 1 according to the first embodiment.

As shown in FIG. 4A, let θ be the angle made by the x-y plane and a direction A of signal light that is incident on the diffraction grating 12, and $β_0$ be the angle made by the y-axis direction and a direction B obtained by projecting the direction A on the x-y plane. As shown in FIG. 4B, let $β_n$ be the diffraction angle when the traveling direction of the signal light component having the wavelength $λ_n$, which is diffracted by the diffraction grating 12, is projected to the x-y plane, let $β_{n-1}$ be the diffraction angle when the traveling direction of the signal light component having the wavelength $λ_{n-1}$, which is diffracted by the diffraction grating 12, is projected to the x-y plane, and ΔL be the distance from the diffraction position on the diffraction grating 12 to the incident position on the fiber collimator $14_n$ along the optical path of the signal light having the wavelength $λ_n$. In addition, let Δd be the distance between the incident position of the signal light component having the wavelength $λ_n$ separated by the diffraction grating 12 on the fiber collimator $14_n$ and the incident position of the signal light component having the wavelength $λ_{n-1}$ separated by the diffraction grating 12 on the fiber collimator $14_{n-1}$. The incident positions on the fiber collimators correspond to light-receiving positions.

The optical paths of the diffracted signal light components of the respective wavelengths are changed by optical path changing means such that a relation given by $$Δd > 2ΔL \cos θ \sin(|β_n - β_{n-1}|/2) \quad (3)$$

holds. When the outer diameter of the fiber collimator is taken into consideration, the distance Δd is preferably 1 mm or more, more preferably, 1.5 mm or more, and most preferably, 3 mm or more.

The right-hand side of inequality (3) indicates the distance between the incident position of the signal light component having the wavelength $λ_n$ on the fiber collimator $14_n$ and the incident position of the signal light component having the wavelength $λ_{n-1}$ on the fiber collimator $14_{n-1}$ when the optical paths of the diffracted signal light components of the respective wavelengths are not changed by the optical path changing means.

In the optical signal processing apparatus 1 according to the first embodiment, since the optical path of each signal light component having the wavelength $λ_n$ is deflected and changed by the prism $13_n$, the spatial interval between the optical paths of the signal light components of the respective wavelengths becomes sufficiently large. Hence, the optical signal processing apparatus 1 can be made compact because it can array the fiber collimators $14_1$ to $14_4$ even when the wave spacing is small.

(Second Embodiment)

Figure 5:
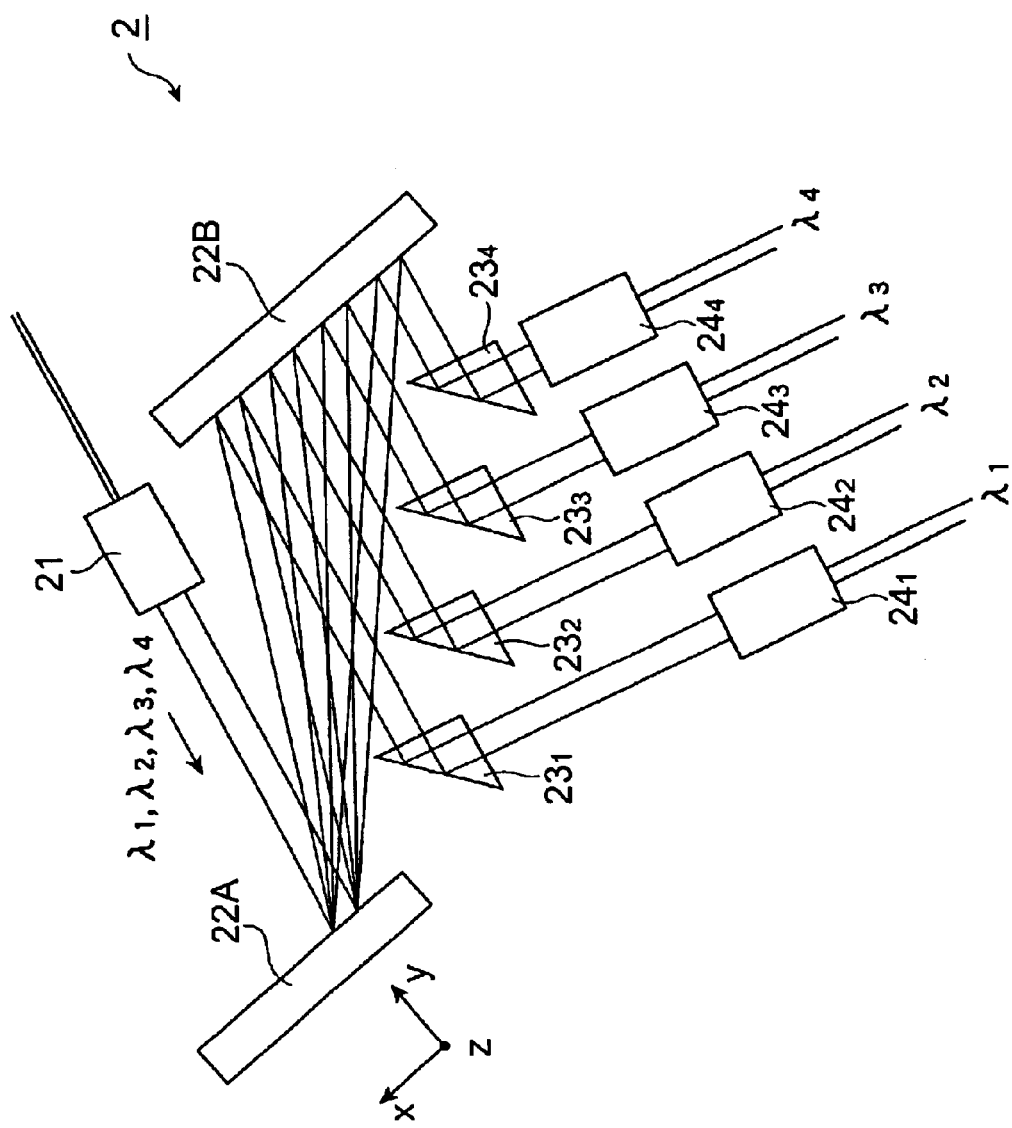
FIG. 5 is a view showing the arrangement of an optical signal processing apparatus 2 according to the second embodiment.

An optical signal processing apparatus according to the second embodiment of the present invention will be described next. FIG. 5 is a view showing the arrangement of an optical signal processing apparatus 2 according to the second embodiment. FIG. 5 shows an x-y-z Cartesian coordinate system for the descriptive convenience. The optical signal processing apparatus 2 shown in FIG. 5 can be used as a 4-channel optical multiplexer/demultiplexer and comprises a fiber collimator 21, diffraction gratings 22A and 22B serving as wavelength separation means, right-angle prisms $23_1$ to $23_4$ serving as optical path changing means, and fiber collimators $24_1$ to $24_4$.

The fiber collimators 21 and $24_1$ to $24_4$ are the same as in the first embodiment. The diffraction gratings 22A an 22B have identical structures in which parallel gratings are formed in the z-axis direction at a period Λ. The grating surface of the diffraction grating 22A and that of the diffraction grating 22B are parallel and oppose each other.

The fiber collimator 21 collimates signal light having multiple wavelengths $λ_1$ to $λ_4$ and outputs the signal light. The output signal light travels in parallel to the x-y plane. The diffraction grating 22A receives the signal light with multiple wavelengths, separates the signal light with multiple wavelengths into signal light components of the respective wavelengths, and outputs the signal light components of the respective wavelengths to spatially different optical paths. More specifically, the diffraction grating 22A receives the multi-wavelength signal light components collimated by and output from the fiber collimator 21 on its grating surface at an incident angle $β_0$ and diffracts signal light components with wavelengths $λ_n$ at diffraction angles $β_n$ corresponding to the wavelengths (n is an integer, $1 ≤ n ≤ 4$). The diffracted signal light components of the respective wavelengths also travel in parallel to the x-y plane.

The diffraction grating 22B receives the signal light with the wavelengths $λ_n$ from the diffraction grating 22A on its grating surface at the incident angle $β_n$ and diffracts the signal light components at the diffraction angle $β_0$. The diffracted signal light components with the wavelengths $λ_n$ travel in parallel to the x-y plane and in parallel to each other. A prisms $23_n$ deflect, by 90°, the optical paths of the signal light components having the wavelengths $λ_n$, which are diffracted by and output from the diffraction grating 22B. Each signal light component with a deflected optical path also travels in parallel to the x-y plane. Fiber collimators $24_n$ focus and receive the signal light components having the wavelengths $λ_n$ output from the prisms $23_n$.

In this optical signal processing apparatus 2, when the signal light with the multiple wavelengths $λ_1$ to $λ_4$ is collimated by and output from the fiber collimator 21, the signal light components with the wavelengths $λ_1$ to $λ_4$ are diffracted by the diffraction grating 22A at diffraction angles corresponding to the wavelengths and separated for the respective wavelengths. The separated signal light components of the respective wavelengths are output to spatially different optical paths. The signal light components of the respective wavelengths, which are diffracted by the diffraction grating 22A, are further diffracted by the diffraction grating 22B and travel in parallel to each other. The signal light components with the wavelengths $λ_n$ are deflected at their optical paths by the prisms $23_n$ and input to the fiber collimators $24_n$. In this case, the optical signal processing apparatus 2 operates as an optical demultiplexer which demultiplexes the signal light with the multiple wavelengths $λ_1$ to $λ_4$.

When the signal light components with the wavelengths $λ_n$ are collimated by and output from the fiber collimators $24_n$, the signal light components with the wavelengths $λ_n$ are deflected at their optical paths by the prisms $23_n$, sequentially diffracted by the diffraction gratings 22B and 22A, and input to the fiber collimator 21. In this case, the optical signal processing apparatus 2 operates as an optical multiplexer which multiplexes the signal light components with the multiple wavelengths $λ_1$ to $λ_4$.

In the second embodiment as well, for signal light components having adjacent wavelengths $λ_{n-1}$ and $λ_n$ of the signal light components with the multiple wavelengths $\lambda_1$ to $\lambda_4$, the distance between the optical path of the signal light component with the wavelength $\lambda_{n-1}$, which is deflected by the prism $23_{n-1}$, and the optical path of the signal light component with the wavelength $\lambda_n$, which is deflected by the prism $23_n$, is set to be larger than the distance between a position $P_{n-1}$ and a position $P_n'$, as in the first embodiment. In addition, the optical paths of the signal light components of the respective wavelengths are changed by optical path changing means such that inequality (3) holds. In this embodiment, a position G is a position at which multi-wavelength signal light is incident on the diffraction grating 22A and wavelength-separated. The position $P_{n-1}$ is a position at which the optical path of the signal light component having the wavelength $\lambda_{n-1}$ is deflected by the prism $23_{n-1}$. A distance from the position G to the position $P_{n-1}$ along the optical path of the signal light component having the wavelength $\lambda_{n-1}$ is defined as $L_{n-1}$. The position $P_n'$ is located on the extended line of the optical path of the signal light component having the wavelength $\lambda_n$, which travels from the diffraction grating 22B to the prism $23_n$. The distance from the position G to the position $P_n'$ along the optical path is $L_{n-1}$.

Figure 6:
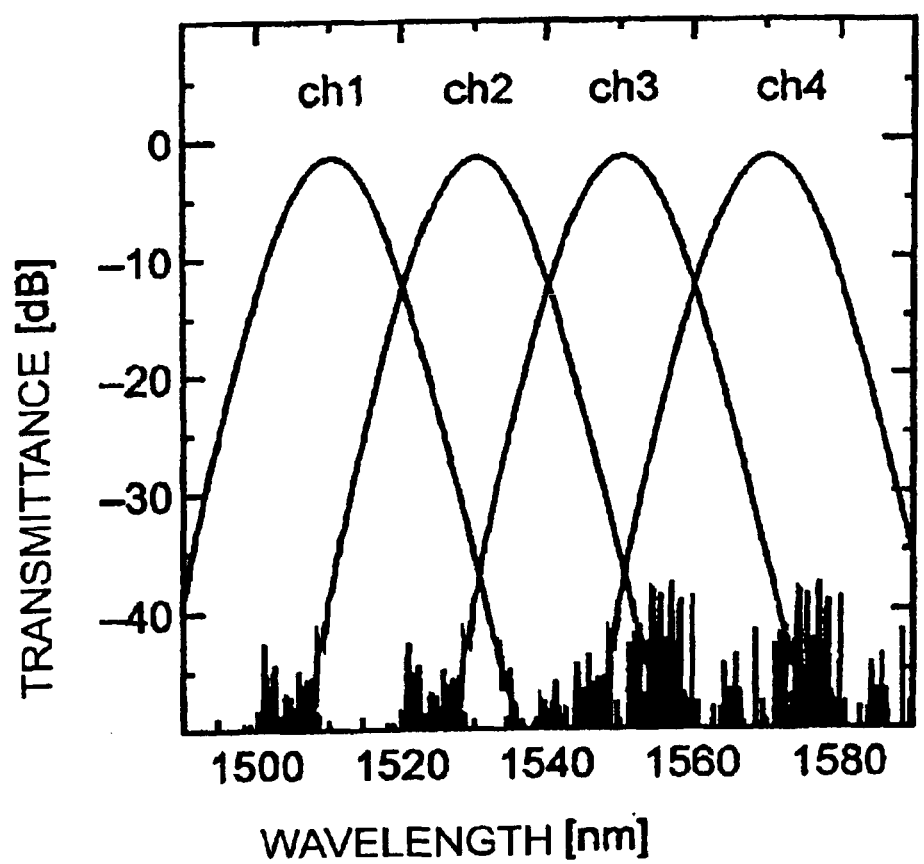
FIG. 6 is a graph showing the transmission characteristics of the optical signal processing apparatus 2 according to the second embodiment.

FIG. 6 is a graph showing the transmission characteristics of the optical signal processing apparatus 2 according to the second embodiment. FIG. 6 shows the transmission characteristic between the fiber collimator 21 and each fiber collimator $24_n$. The grating period Λ of the diffraction gratings 22A and 22B is 600 slits/mm. The incident angle $β_0$ of signal light on the diffraction grating 22A is 15°. The lens diameter of each fiber collimator $24_n$ is 2 mm. In addition, $\lambda_1=1510$ nm, $\lambda_2=1530$ nm, $\lambda_3=1550$ nm, and $\lambda_4=1570$ nm. As compared to the transmission characteristics of the first embodiment (FIG. 3), the transmission characteristics of the second embodiment (FIG. 6) have a wider transmission bandwidth.

The optical signal processing apparatus 2 according to the second embodiment exhibits the same effect as in the first embodiment. The optical signal processing apparatus 2 also provides the following effect. That is, since the optical paths of the signal light components having the wavelengths $\lambda_n$ from the diffraction grating 22B to the fiber collimators $24_n$ are parallel, the optical signal processing apparatus 2 can easily be assembled.

(Third Embodiment)

Figure 7:
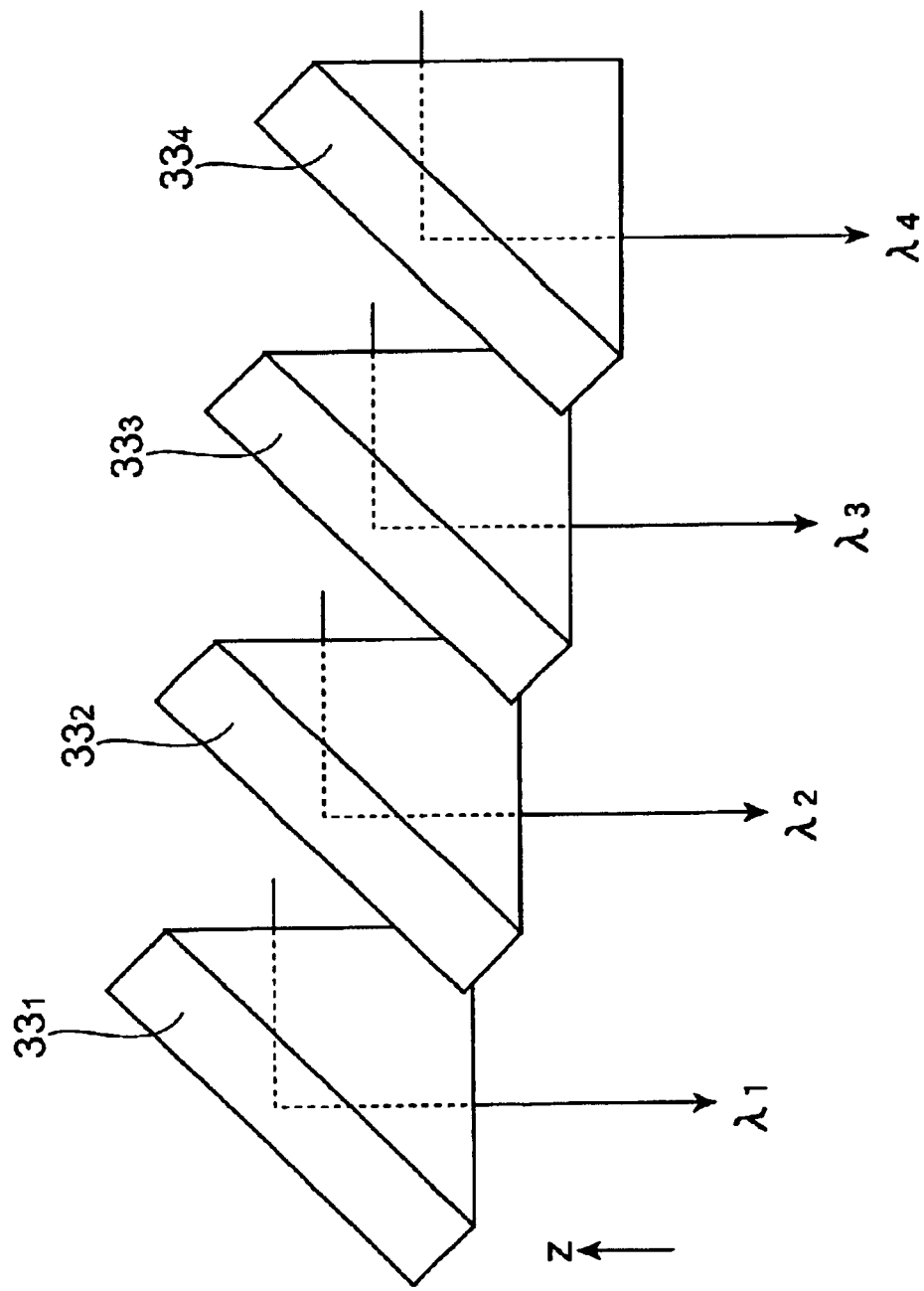
FIG. 7 is a view showing the arrangement of the optical path changing means of an optical signal processing apparatus according to the third embodiment.

An optical signal processing apparatus according to the third embodiment of the present invention will be described next. For the optical signal processing apparatus according to the third embodiment, the arrangement of the optical path changing means in the optical signal processing apparatus according to the first or second embodiment is changed. Hence, only the arrangement of the optical path changing means will be described. FIG. 7 is a view showing the arrangement of the optical path changing means of the optical signal processing apparatus according to the third embodiment.

In the first or second embodiment, the optical path of each signal light component having the wavelength $\lambda_n$ before the signal light component becomes incident from the diffraction grating on the prism (optical path changing means) travels in parallel to the x-y plane. In addition, the optical path of each signal light component having the wavelength $\lambda_n$ after the optical path is changed by the prism is also parallel to the x-y plane. To the contrary, in the third embodiment, the optical path of each signal light component having the wavelength $\lambda_n$ before the signal light component becomes incident on a prism $33_n$ serving as an optical path changing means travels in parallel to the x-y plane, though the optical path of each signal light component having the wavelength $\lambda_n$ after the optical path is changed by the prism $33_n$ travels in parallel to the z-axis direction.

In the third embodiment as well, for signal light components having adjacent wavelengths $\lambda_{n-1}$ and $\lambda_n$ of the signal light components with multiple wavelengths $\lambda_1$ to $\lambda_4$, the distance between the optical path of the signal light component with the wavelength $\lambda_{n-1}$ which is deflected by a prism $33_{n-1}$, and the optical path of the signal light component with the wavelength $\lambda_n$, which is deflected by a prism $33_n$, is set to be larger than the distance between a position $P_{n-1}$ and a position $P_n'$. In addition, the optical paths of the signal light components of the respective wavelengths after diffraction are changed by optical path changing means such that inequality (3) holds.

The optical signal processing apparatus according to the third embodiment exhibits the same effect as in the first or second embodiment. The optical signal processing apparatus also provides the following effect. That is, since each prism $33_n$ can easily be arranged, the optical signal processing apparatus can easily be assembled.

(Fourth Embodiment)

Figure 8:
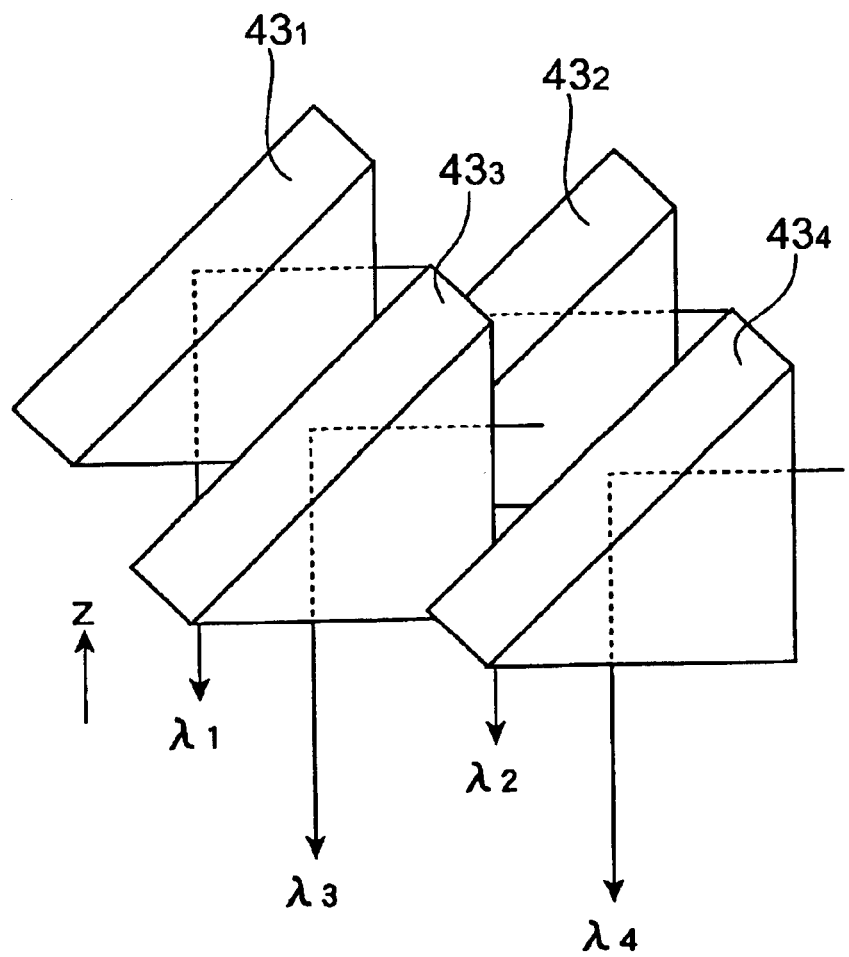
FIG. 8 is a view showing the arrangement of an optical path changing means of the optical signal processing apparatus according to the fourth embodiment.

An optical signal processing apparatus according to the fourth embodiment of the present invention will be described next. Even for the optical signal processing apparatus according to the fourth embodiment, the arrangement of the optical path changing means in the optical signal processing apparatus according to the first or second embodiment is changed. Hence, only the arrangement of the optical path changing means will be described. FIG. 8 is a view showing the arrangement of the optical path changing means of the optical signal processing apparatus according to the fourth embodiment.

In the fourth embodiment as well, the optical path of each signal light component having a wavelength $\lambda_n$ before the signal light component becomes incident on a prism $43_n$ serving as an optical path changing means travels in parallel to the x-y plane, though the optical path of each signal light component having the wavelength $\lambda_n$ after the optical path is changed by the prism $43_n$ travels in parallel to the z-axis direction, as in the third embodiment. In the fourth embodiment, however, prisms $43_2$ and $43_4$ are arranged closer to the diffraction grating than prisms $43_1$ and $43_3$, unlike the third embodiment.

In the fourth embodiment as well, for signal light components having adjacent wavelengths $\lambda_{n-1}$ and $\lambda_n$ of the signal light components with multiple wavelengths $\lambda_1$ to $\lambda_4$, the distance between the optical path of the signal light component with the wavelength $\lambda_{n-1}$, which is deflected by a prism $43_{n-1}$, and the optical path of the signal light component with the wavelength $\lambda_n$, which is deflected by a prism $43_n$, is set to be larger than the distance between a position $P_{n-1}$ and a position $P_n'$. In addition, the optical paths of the signal light components of the respective wavelengths after diffraction are changed by optical path changing means such that inequality (3) holds.

The optical signal processing apparatus according to the fourth embodiment exhibits the same effect as in the third embodiment. The optical signal processing apparatus also provides the following effect. That is, since the prisms $43_n$ are alternately arranged, the optical signal processing apparatus can be made more compact.

(Fifth Embodiment)

Figure 9:
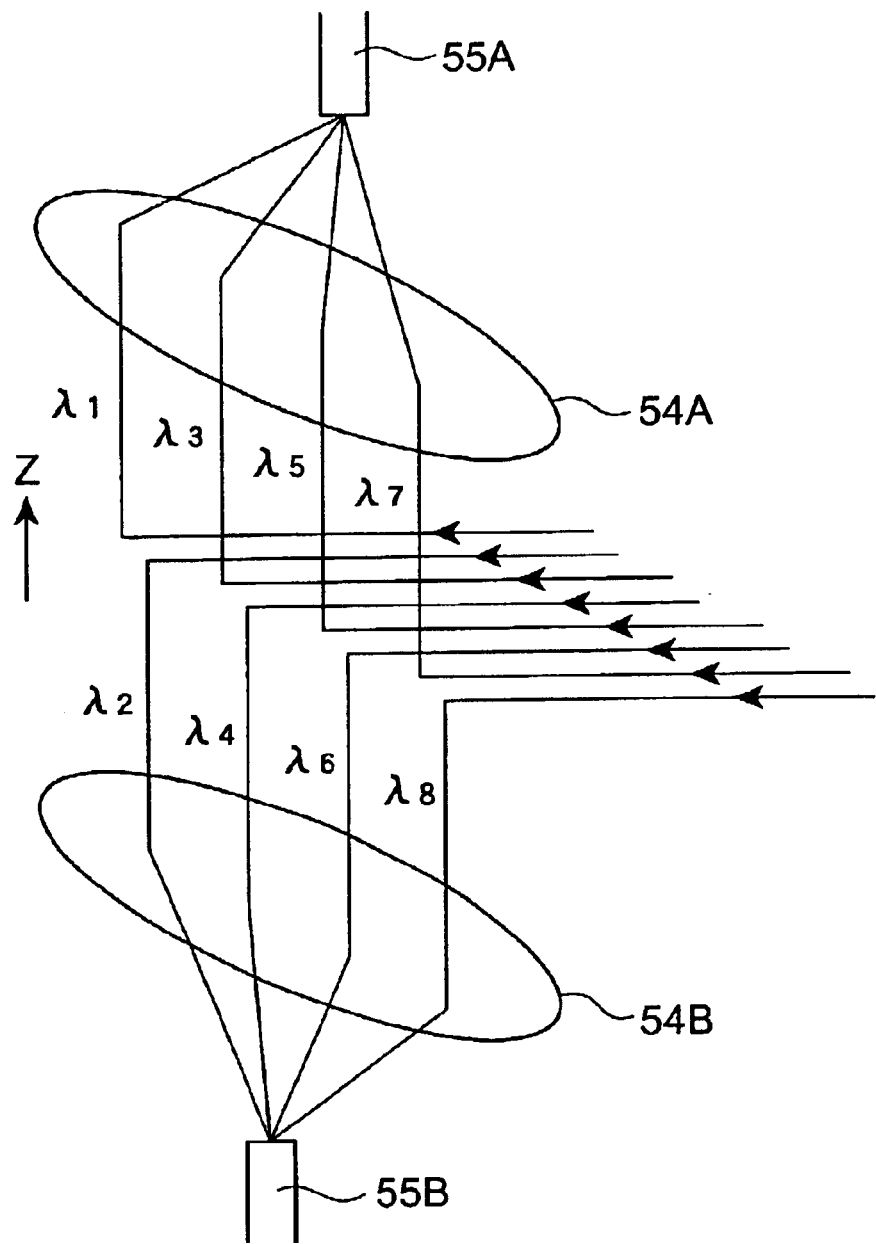
FIG. 9 is a view showing the arrangement of an optical path changing means of an optical signal processing apparatus according to the fifth embodiment.

An optical signal processing apparatus according to the fifth embodiment of the present invention will be described next. The optical signal processing apparatus according to the fifth embodiment operates as an interleaver. Even for the optical signal processing apparatus according to the fifth embodiment, the arrangement of the optical path changing means in the optical signal processing apparatus according to the first or second embodiment is changed. Hence, only the arrangement of the optical path changing means will be described. FIG. 9 is a view showing the arrangement of the optical path changing means of the optical signal processing apparatus according to the fifth embodiment. FIG. 9 shows not the detailed arrangement of the optical path changing means but a state wherein optical paths are changed by the optical path changing means.

In this embodiment, assume eight wavelengths $\lambda_1$ to $\lambda_8$. Note that $\lambda_1<\lambda_2<\lambda_3<\lambda_4<\lambda_5<\lambda_6<\lambda_7<\lambda_8$. As shown in FIG. 9, signal light components having the wavelengths $\lambda_1$ to $\lambda_8$, which are diffracted by the diffraction grating and separated, travel in parallel to the x-y plane. Then, the optical paths are deflected by the optical path changing means. The signal light components having the wavelengths $\lambda_1$, $\lambda_3$, $\lambda_5$, and $\lambda_7$ travel in the +z-direction after their optical paths are changed by the optical path changing means, are focused by a lens 54A, and become incident on the end face of an optical fiber 55A. On the other hand, the signal light components having the wavelengths $\lambda_2$, $\lambda_4$, $\lambda_6$, and $\lambda_8$ travel in the −z-direction after their optical paths are changed by the optical path changing means, are focused by a lens 54B, and become incident on the end face of an optical fiber 55B.

That is, in the fifth embodiment, the optical path changing means change the optical paths such that the optical paths of the signal light components having wavelengths $\lambda_{2p}$ (p is an integer, $2\leq 2p\leq 8$) and those of the signal light components having wavelengths $\lambda_{2q-1}$ (q is an integer, $1\leq 2q-1\leq 8$) travel in different directions. The lens 54A acts as a first optical multiplex means for multiplexing the signal light components having wavelengths $\lambda_{2p}$ after the optical paths are changed by the optical path changing means and outputting the signal light. The lens 54B acts as a second optical multiplex means for multiplexing the signal light components having wavelengths $\lambda_{2q-1}$ after the optical paths are changed by the optical path changing means and outputting the signal light.

Figure 10:
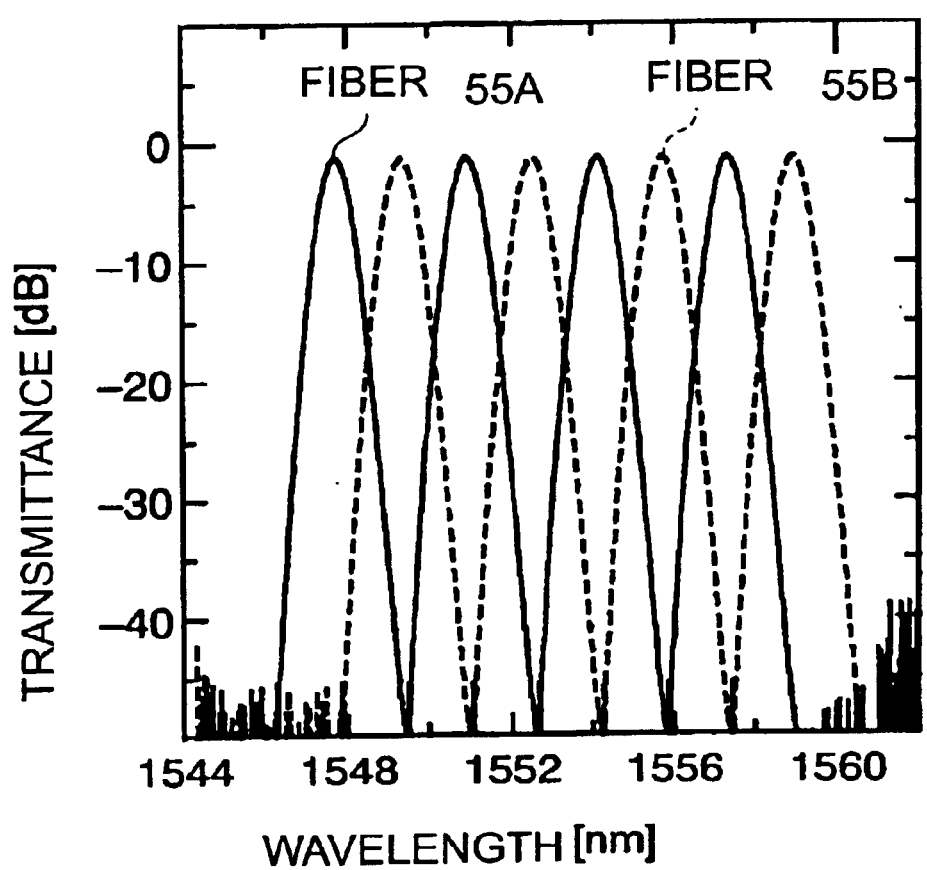
FIG. 10 is a graph showing the transmission characteristics of the optical signal processing apparatus according to the fifth embodiment.

FIG. 10 is a graph showing the transmission characteristics of the optical signal processing apparatus according to the fifth embodiment. The signal light wave spacing is 1.6 nm. Referring to FIG. 10, the solid lines indicate the transmission characteristics of light components focused onto the optical fiber 55A, and the broken lines indicate the transmission characteristics of light components focused onto the optical fiber 55B. As shown in FIG. 10, the eight signal light components with the different wavelengths are alternately passed to the optical fibers 55A and 55B.

(Sixth Embodiment)

Figure 11:
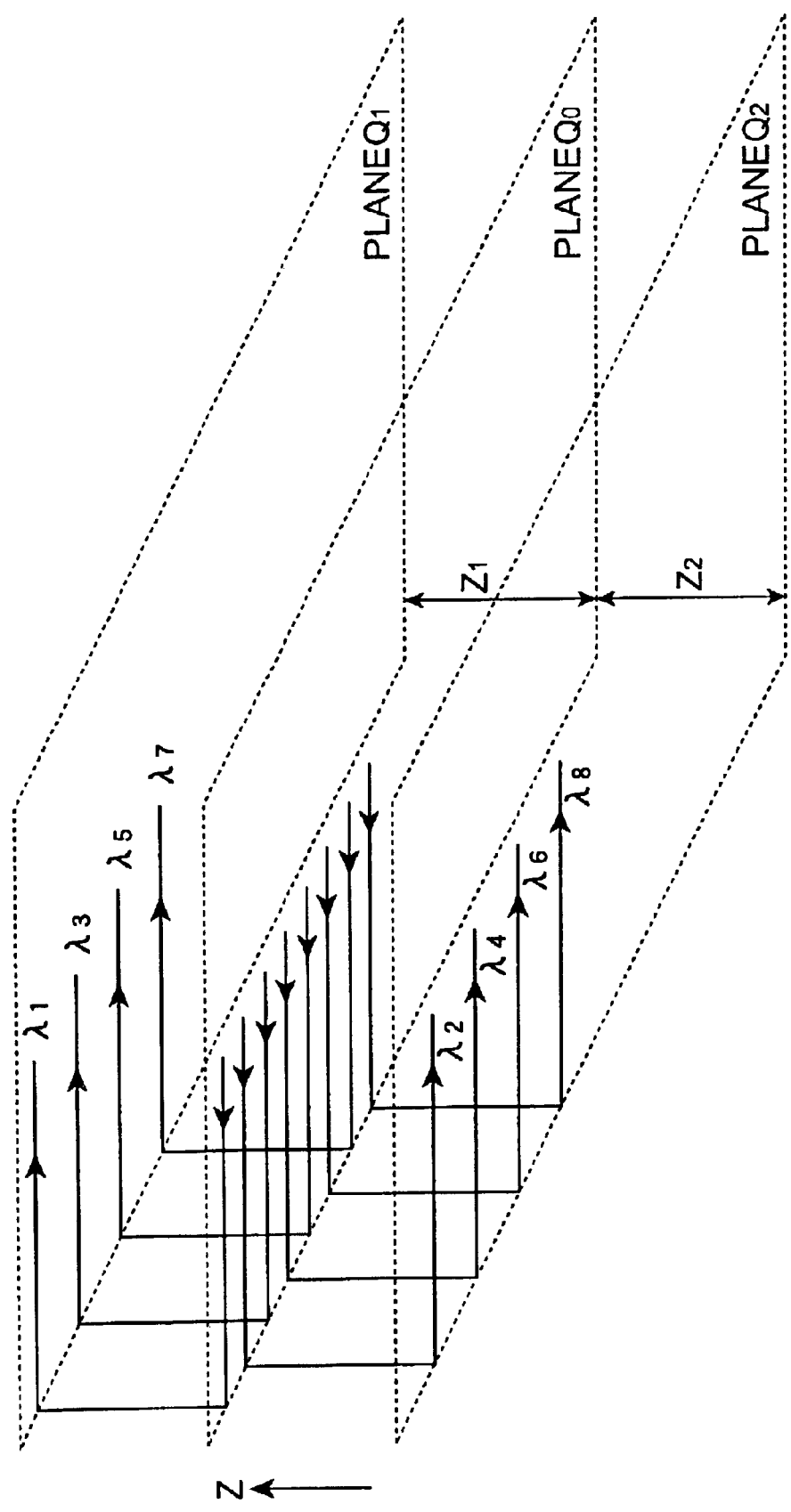
FIG. 11 is a view showing the arrangement of an optical path changing means of an optical signal processing apparatus according to the sixth embodiment.

An optical signal processing apparatus according to the sixth embodiment of the present invention will be described next. The optical signal processing apparatus according to the sixth embodiment also operates as an interleaver. Even for the optical signal processing apparatus according to the sixth embodiment, the arrangement of the optical path changing means in the optical signal processing apparatus according to the first or second embodiment is changed. Hence, only the arrangement of the optical path changing means will be described. FIG. 11 is a view showing the arrangement of the optical path changing means of the optical signal processing apparatus according to the sixth embodiment. FIG. 11 shows not the detailed arrangement of the optical path changing means but a state wherein optical paths are changed by the optical path changing means.

In this embodiment, assume eight wavelengths $\lambda_1$ to $\lambda_8$. Note that $\lambda_1<\lambda_2<\lambda_3<\lambda_4<\lambda_5<\lambda_6<\lambda_7<\lambda_8$. As shown in FIG. 11, signal light components having the wavelengths $\lambda_1$ to $\lambda_8$, which are diffracted by the diffraction grating and separated, travel on a plane $Q_0$ parallel to the x-y plane. Then, the optical paths are deflected twice by the optical path changing means. The signal light components having the wavelengths $\lambda_1$, $\lambda_3$, $\lambda_5$, and $\lambda_7$ travel in the +z-direction after the first change of optical paths by the optical path changing means, then travel on a plane $Q_1$ after the second change of optical paths, and become incident on the diffraction grating again. The signal light components having the wavelengths $\lambda_2$, $\lambda_4$, $\lambda_6$, and $\lambda_8$ travel in the −z-direction after the first change of optical paths by the optical path changing means, then travel on a plane $Q_2$ after the second change of optical paths, and become incident on the diffraction grating again.

Figure 12:
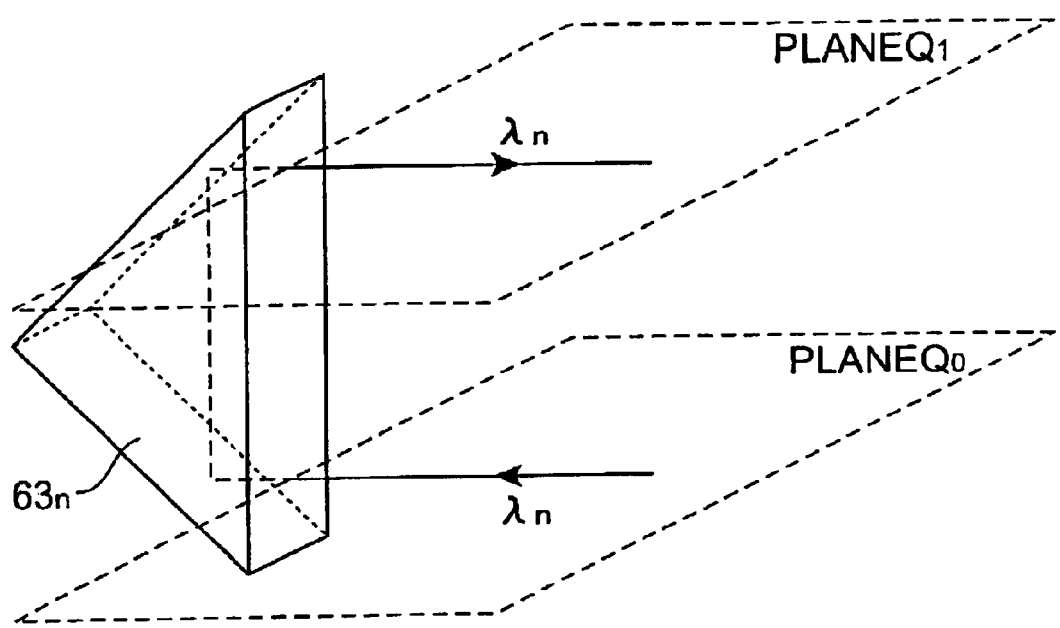
FIG. 12 is a view showing the arrangement of part of the optical path changing means of the optical signal processing apparatus according to the sixth embodiment.

FIG. 12 is a view showing the arrangement of part of the optical path changing means of the optical signal processing apparatus according to the sixth embodiment. FIG. 12 shows a right-angle prism $63_n$ which changes the optical path of a signal light component having a wavelength $\|_n$. As shown in FIG. 12, the prism $63_n$ reflects the signal light component with the wavelength $\lambda_n$ by each of two surfaces that are perpendicular to each other, thereby deflecting the optical path on the plane $Q_0$ onto the plane $Q_1$ (or plane $Q_2$).

The planes $Q_0$ to $Q_2$ are parallel to the x-y plane. The planes $Q_1$ and $Q_0$ are separated by an interval $z_1$ in the z-axis direction. The planes $Q_2$ and $Q_0$ are separated by an interval $z_2$ in the z-axis direction. The traveling direction of the signal light component with the wavelength $\lambda_n$ non the plane $Q_1$ is parallel to and reverse to that of the signal light component with the wavelength $\lambda_n$ on the plane $Q_0$ (n=1, 3, 5, 7). The traveling direction of the signal light component with the wavelength $\lambda_n$ on the plane $Q_2$ is parallel to and reverse to that of the signal light component with the wavelength $\lambda_n$ on the plane $Q_0$ (n=2, 4, 6, 8). The diffraction grating diffracts again the signal light components with the wavelengths $\lambda_{2p}$, which become incident from the optical path changing means, multiplexes the signal light components, and outputs the signal light. The diffraction grating also diffracts again the signal light components with the wavelengths $\lambda_{2q-1}$, which become incident from the optical path changing means, multiplexes the signal light components, and outputs the signal light.

That is, in the sixth embodiment, the optical path changing means change the optical paths such that the optical paths of the signal light components having wavelengths $\lambda_{2p}$ (p is an integer, $2\leq 2p\leq 8$) and those of the signal light components having wavelengths $\lambda_{2q-1}$ (q is an integer, $1\leq 2q-1\leq 8$) travel in different directions. The optical path changing means change the optical paths of the signal light components with the wavelength $\lambda_{2p}$ in the direction (+z-direction) perpendicular to the plane $Q_0$, then change the optical paths in the direction on the plane $Q_1$, i.e., the direction reverse to the direction of the optical paths of the signal light components on the plane $Q_0$, and make the signal light components incident on the diffraction grating again. The optical path changing means also change the optical paths of the signal light components with the wavelength $\lambda_{2q-1}$ in the direction (−z-direction) perpendicular to the plane $Q_0$, then change the optical paths in the direction on the plane $Q_2$, i.e., the direction reverse to the direction of the optical paths of the signal light components on the plane $Q_0$, and make the signal light components incident on the diffraction grating again.

As described above, the optical signal processing apparatus according to the sixth embodiment operates not only as a demultiplexing interleaver, like the fifth embodiment, but also as a multiplexing interleaver when signal light components travel in reverse directions. In the fifth embodiment, a lens having a large effective diameter must be used. However, in the optical signal processing apparatus according to the sixth embodiment, since the signal light components are focused by the diffraction grating, the coupling loss is small.

(Modifications)

The present invention is not limited to the above embodiments, and various changes and modifications can be made. For example, in the above embodiments, the optical path changing means includes a prism. However, the optical path changing means may include a mirror. In the above embodiments, the wavelength separation means includes a reflecting diffraction grating. However, the wavelength separation means may include a transmitting diffraction grating.

As has been described above in detail, according to the present invention, when multiplexed signal light having the multiple wavelengths $\lambda_1$ to $\lambda_n$ is input to the wavelength separation means, the multi-wavelength signal light is separated for the respective wavelengths and output to different optical paths. The optical paths of the wavelength-separated signal light components of the respective wavelengths are changed by the optical path changing means. With this optical path change, the optical path interval between the signal light components of the respective wavelengths is increased. The signal light components can also propagate in a reverse direction. Even when the degree of optical path separation for the signal light components of the respective wavelengths by the wavelength separation means is low, the optical path interval between the signal light components of the respective wavelengths is increased by the optical path changing means. Hence, the optical signal processing apparatus according to the present invention can be made compact because the optical path after optical path separation for the signal light components of the respective wavelengths by the wavelength separation means can be short.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Applications No. 2002-68894 filed on Mar. 13, 2002 is hereby incorporated by reference.

What is claimed is:

1. An optical signal processing apparatus comprising:
   wavelength separation means for receiving multiplexed signal light having multiple wavelengths $\lambda_1$ to $\lambda_N$ ($\lambda_{n-1} < \lambda_n$; N is an integer, $2 \leq N$; n is an integer, $2 \leq n \leq N$), separating the multi-wavelength signal light into signal light components of respective wavelengths, and outputting the separated signal light components of the respective wavelengths to spatially different optical paths; and
   optical path changing means for changing the optical paths of the signal light components of the respective wavelengths output from said wavelength separation means,
   wherein for a first signal light component (wavelength $\lambda_{n-1}$) and second signal light component (wavelength $\lambda_n$), which have adjacent wavelengths in the signal light components with the multiple wavelengths, letting G be a position at which the multi-wavelength signal light is wavelength-separated by said wavelength separation means, $P_{n-1}$ be a position at which an optical path of the first signal light component is changed by said optical path changing means, $L_{n-1}$ be a distance from the position G to the position $P_{n-1}$ along the optical path of the first signal light component, and $P_n$ be a position which is located on an optical path of the second signal light component from the position G to said optical path changing means or on an extended line of the optical path, and separated from the position G by the distance $L_{n-1}$, a distance between the optical paths of the first and second signal light components, which are changed by said optical path changing means, is set to be larger than a distance between the position $P_{n-1}$ and the position $P_n$.

2. An apparatus according to claim 1, wherein said wavelength separation means includes a diffraction grating.

3. An apparatus according to claim 2, wherein letting $\Lambda$ be a grating period of said diffraction grating, $\theta$ be an angle made by a plane perpendicular to a grating direction of said diffraction grating and an incident direction of signal light on said diffraction grating, $\beta_n$ be a diffraction angle when a traveling direction of the second signal light component, which is diffracted by said diffraction grating, is projected to the plane perpendicular to the grating direction, $\beta_{n-1}$ be a diffraction angle when a traveling direction of the first signal light component, which is diffracted by said diffraction grating, is projected to the plane perpendicular to the grating direction and $\Delta L$ be a distance from a diffraction position on said diffraction grating to a light-receiving position along the optical path of the second signal light component, a distance $\Delta d$ between the light-receiving position of the second signal light component wavelength-separated by said diffraction grating and a light-receiving position of the first signal light component wavelength-separated by said diffraction grating satisfies $$\Delta d > 2\Delta L \cos\theta \sin(|\beta_n - \beta_{n-1}|/2).$$

4. An apparatus according to claim 3, wherein the distance $\Delta d$ is not less than 1 mm.

5. An apparatus according to claim 3, wherein the distance $\Delta d$ is not less than 1.5 mm.

6. An apparatus according to claim 3, wherein the distance $\Delta d$ is not less than 3 mm.

7. An apparatus according to claim 1, wherein said wavelength separation means includes two diffraction gratings having identical structures, and the signal light is sequentially diffracted by said two diffraction gratings.

8. An apparatus according to claim 1, wherein said optical path changing means includes a prism.

9. An apparatus according to claim 1, wherein said optical path changing means includes an integrated member which changes the optical paths of the multi-wavelength signal light components.

10. An apparatus according to claim 1, wherein said optical path changing means changes the optical paths of the signal light components of the respective wavelengths output from said wavelength separation means to a direction perpendicular to a predetermined plane including the optical paths of the signal light components of the respective wavelengths from said wavelength separation means to said optical path changing means.

11. An apparatus according to claim 1, wherein said optical path changing means changes the optical paths so as to make an optical path of a signal light component having a wavelength $\lambda_{2p}$ (p is an integer, $2 \leq 2p \leq N$) and that of a signal light component having a wavelength $\lambda_{2q-1}$ (q is an integer, $1 \leq 2q-1 \leq N$) travel in different directions.

12. An apparatus according to claim 11, further comprising first optical multiplex means for multiplexing the signal light components having the wavelengths $\lambda_{2p}$ after the optical paths are changed by said optical path changing means and outputting the signal light.

13. An apparatus according to claim 11, further comprising second optical multiplex means for multiplexing the signal light components having the wavelengths $\lambda_{2q-1}$ after the optical paths are changed by said optical path changing means and outputting the signal light.

14. An apparatus according to claim 11, wherein said optical path changing means changes the optical path of the signal light component with the wavelength $\lambda_{2p}$ to a direction perpendicular to the predetermined plane, then changes the optical path to a direction reverse to the direction of the optical path of the signal light component on the predetermined plane, and makes the signal light component incident on said wavelength separation means.

15. An apparatus according to claim 11, wherein said optical path changing means changes the optical path of the signal light component with the wavelength $\lambda_{2q-1}$ to a direction perpendicular to the predetermined plane, then changes the optical path to a direction reverse to the direction of the optical path of the signal light component on the predetermined plane, and makes the signal light component incident on said wavelength separation means.

* * * * *